United States Patent

Hashimoto et al.

[11] Patent Number: 5,989,716
[45] Date of Patent: *Nov. 23, 1999

[54] MAGNETIC RECORDING MEDIUM

[75] Inventors: Hiroshi Hashimoto; Katsuhiko Meguro; Yuichiro Murayama, all of Odawara, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,446

[22] Filed: May 7, 1997

[30] Foreign Application Priority Data

May 13, 1996 [JP] Japan ..................................... 8-117403

[51] Int. Cl.⁶ .................................................. G11B 5/702
[52] U.S. Cl. ............... 428/425.9; 428/522; 428/694 BG; 428/694 BS; 428/900
[58] Field of Search ...................... 428/694 BG, 694 BS, 428/900, 425.9, 522

[56] References Cited

U.S. PATENT DOCUMENTS 5,023,135   6/1991   Hasumi et al. .......................... 428/336
5,436,070   7/1995   Schroer et al. .......................... 428/323
5,618,637   4/1997   Tamai et al. .......................... 428/694 B

*Primary Examiner*—Stevan A. Resan
*Attorney, Agent, or Firm*—Sughrue, Mion, Zinn, Macpeak & Seas, PLLC

[57] ABSTRACT

The present invention provides a magnetic recording medium, in which a binder does not migrates toward the surface of a magnetic layer and which has high durability. Said magnetic recording layer comprises at least one type or more of organic phosphorus compounds selected from the following formulae (1) to (3) and a binder, which contains an amino group or a quaternary ammonium base:

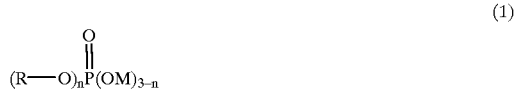

(1)

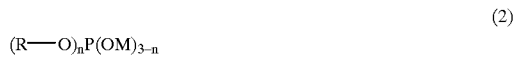

(2)

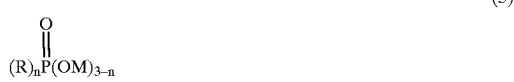

(3)

where R represents substituted or non-substituted alkyl group, alkenyl group or aryl group, M represents hydrogen atom or alkali metal or ammonium, and n is 1 or 2.

4 Claims, No Drawings

MAGNETIC RECORDING MEDIUM

BACKGROUND OF THE INVENTION

The present invention relates to a magnetic recording medium, which has very high electromagnetic transfer characteristics and high durability and comprises a magnetic layer where ferromagnetic powder and a binder are dispersed, said magnetic layer being placed on a non-magnetic support member, and in particular to a magnetic recording medium having high durability, in which no head contamination occurs.

The magnetic recording medium is widely used as recording tape, video tape or floppy disk. In the magnetic recording medium, a magnetic layer where ferromagnetic powder is dispersed in a binder is deposited on a non-magnetic support member.

The magnetic recording medium must be at high level in electromagnetic transfer characteristics, running durability and running performance. Specifically, in an audio tape for recording and reproducing musical sound, higher ability to reproduce the original sound is required. In a video tape, high ability to reproduce the original picture and excellent electromagnetic transfer characteristics are required.

In addition to the high electromagnetic transfer characteristics, the magnetic recording medium must have good running durability as described above. To provide good running durability, abrasive material and lubricant are added to the magnetic layer.

In the equipment where the magnetic recording medium is used, the medium is brought into contact with and slides on a magnetic head. As a result, low molecular components in the binder of the magnetic recording medium migrate to the surface of the magnetic layer and are attached on the magnetic head, thereby causing contamination of the magnetic head.

The contamination of the magnetic head causes deterioration of the electromagnetic transfer characteristics. In particular, in an equipment used for high density recording, number of revolutions of magnetic head is high. The number of revolutions of the magnetic head is 9,600 rpm in a digital video tape recorder, 1,800 rpm in an analog video tape recorder for domestic use and 5,000 rpm for video tape recorder for business use. As a result, sliding speed between the magnetic recording medium and the magnetic head increases. Accordingly, high durability is required for the magnetic recording medium.

In order that powder such as ferromagnetic powder or non-magnetic powder is adsorbed well to the binder, a binder containing polar group such as acid group, e.g. sulfonic acid, is used. Also, a compound having acid group such as phenylphosphonic acid, functioning as a dispersant, is used to improve dispersion property of the powder.

For example, JP-B-9507500 discloses a magnetic recording medium, which is obtained by combining ethylene oxide modified phosphoric acid ester with a polyurethane having yield point. In this magnetic recording medium, phosphoric acid ester adsorbs well to ferromagnetic powder, and the ethylene oxide modified alkyl component has high affinity with the binder, which has polar group such as COOH, OH, etc. providing good effect to dispersion property. Further, it discloses a magnetic recording medium, in which the polyurethane has yield point and which provides high dynamic strength and high durability. However, dispersion property and durability of this magnetic recording medium are not high enough to be used as the recording medium of high recording density as currently required.

Further, U.S. Pat. No. 5,318,838 (JP-A-1189025), JP-A-3185621, U.S. Pat. No. 5,176,955 (JP-A-4001917), and U.S. Pat. No. 5,582,910 (JP-A-4263116) teach improvement of dispersion property and durability by using a specific type of organic phosphorus compound to be adsorbed on and to cover surface of the magnetic substance and by dispersing with a binder having polar group such as $SO_3M$ group. However, because adsorbing ability of the polar group in the binder is weaker than that of the organic phosphorus compound, the binder is not adsorbed very easily, and non-adsorbed binder migrates to the surface of the magnetic layer. Therefore, its durability is not high enough, and there are problems in both dispersion property and durability as a magnetic recording medium of high density recording as required in the current technique.

According to JP-A-4372717, ferromagnetic powder is coated using a dispersant, which has both acid group and basic group, and it is dispersed by a binder which contains polar group. As a result, acid group adsorbs on the surface of ferromagnetic powder, and the basic group goes out and interacts with the binder having acid group or reacts with and bonded to NCO curing agent, thereby improving durability. Because the polar group of the dispersant has both acid group and basic group, there are strong interactions between dispersants in the coating solution and interactions between dispersant and binder. As a result, ferromagnetic powder, dispersant, binder, etc. are dispersed and viscosity of the prepared coating solution tends to increase. Thus, it is difficult to achieve perfect smoothening of the coating surface.

U.S. Pat. No. 5,023,135 (JP-A-1173417), U.S. Pat. No. 5,153,053 (JP-A-3080425), JP-A-3100918, and JP-A-61172213 each describe a binder containing amino group, and a generalized list of dispersants are given where lecithin and phosphoric acid ester are listed. In particular, JP-A-61172213 describes simultaneous use of lecithin (i.e. phosphorus compound) and an amine-modified vinyl chloride binder. However, lecithin has a problem in that it plasticizes the binder and decreases coating film strength, and durability is not high enough as a magnetic recording medium of high density recording as currently required. Such problems are also pointed out in the JP-B-95007500.

It is an object of the present invention to provide a magnetic recording medium which has excellent dispersion property, high smoothness and electromagnetic transfer characteristics. This magnetic recording medium has high running durability, and wearing of the surface of the magnetic layer or head contamination are avoided in repeated running of the magnetic recording medium with high recording density when it is used in digital tape recorder, and it has excellent storage property under high temperature and high humidity conditions.

SUMMARY OF THE INVENTION

The present invention provides a magnetic recording medium, which comprises a magnetic layer where ferromagnetic powder and a binder are dispersed, said magnetic layer being placed on a non-magnetic support member, whereby said magnetic layer contains at least one type of organic phosphorus compounds selected from the following formulae (1) to (3) and a binder containing an amino group and/or a quaternary ammonium base:

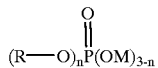
(1)

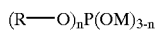
(2)

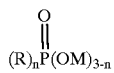
(3)

where R represents substituted or non-substituted alkyl group, alkenyl group or aryl group, M represents hydrogen atom, alkali metal or ammonium, and n represents 1 or 2.

Also, the present invention provides a magnetic recording medium, which comprises a lower layer where non-magnetic powder or ferromagnetic powder and a binder are dispersed, said lower layer being placed on a non-magnetic support member, and at least one or more magnetic layers where ferromagnetic powder and a binder are dispersed, said magnetic layer being placed on the lower layer, whereby at least one of said magnetic layers or said lower layer comprises a binder which contains an organic phosphorus compound selected from the above formulae (1) to (3), an amino group and/or a quaternary ammonium base.

DESCRIPTION OF THE PREFERRED EMBODIMENTS

Specifically, in the conventional type magnetic recording medium, a binder containing a polar group such as sulfonic acid group is used so that the binder is adsorbed to powder such as ferromagnetic powder, non-magnetic powder, etc. and that the dispersion property of the powder is improved, and phenylphosphonic acid, serving as a dispersant, is used to improve dispersion property of the powder. The polar group of the binder and the acid group of the dispersant perform competitive adsorption to the powder. Because phenylphosphonic acid has higher acidity, the binder is not adsorbed to the powder and migrates to the surface of the magnetic layer and adversely affects the medium, thereby causing contamination of the head. This is a phenomenon called migration.

The present inventors have found that this phenomenon can be eliminated by using a binder containing an amino group which is not an acid group but a basic group, and also by using phenylphosphonic acid as dispersant. As a result, phenylphosphonic acid is adsorbed to basic site of the powder, while the binder containing amino group is adsorbed to acid site of the powder. Thus, competitive adsorption does not occur between the two polar groups and these are adsorbed to the powder, and migration can be prevented. In the present invention, a basic binder is used as the binder and an acid group is used as the dispersant, while, on the contrary, acidic polar group may be used as a binder and a basic group may be used as a dispersant.

The organic phosphorus compound to be used as dispersant in the present invention is expressed by one of the following formulae:

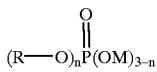
(1)

(2)

(3)

where R represents substituted or non-substituted alkyl group, alkenyl group or aryl group, M represents hydrogen atom, alkali metal or ammonium, and n represents 1 or 2.

In the formulae (1) to (3), typical example of R is a straight-chain or branched alkyl group, preferably having 1 to 22 carbon atoms. For example, R may represent methyl group, propyl group, butyl group, hexyl group, heptyl group, octyl group, nonyl group, decyl group, dodecyl group, tetradecyl group or octadecyl group.

As the straight-chain or the branched alkenyl group, for example, vinyl group, propenyl group, isopropenyl group, butenyl group, pentenyl group, allyl group and oleyl group may be used.

As the aryl group, phenyl group, naphthyl group, anthryl group, diphenyl group, diphenylmethyl group, p-ethylphenyl group, tolyl group, xylyl group, etc. may be used.

As an example of alkyl group, alkenyl group or aryl group having a substitutional group other than hydrocarbon group, 2-aminoethyl group, 2-butoxyethyl group and p-phenyl group may be used.

Further, as the aryl group, a group containing a ring other than benzene ring such as indene or tetralin may be used.

Typical examples of the organic phosphorus compounds expressed by the above formulae (1) to (3) are as follows: mono- and di-ester of phosphoric acid and salts of these compounds such as:

α-naphthyl phosphoric acid

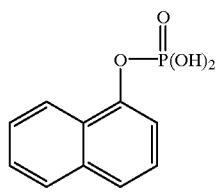

phenyl phosphoric acid

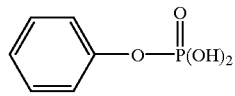

diphenyl phosphoric acid

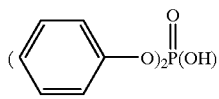

n-butyl phosphate

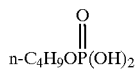

di-n-butyl phosphate

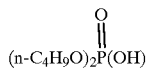

di-(2-ethylhexyl) phosphate

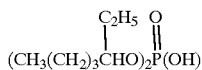

isopropyl phosphate

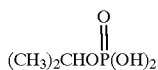

diisopropyl phosphate

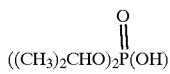

mono- and di-ester of phosphorous acid and salts of these compounds such as:

di-n-butyl phosphite

diethyl phosphite

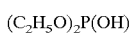

dioleyl phosphite

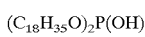

diphenyl phosphoric acid

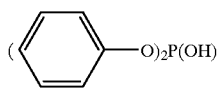

phosphonic acid such as:

p-ethylbenzene phosphonic acid

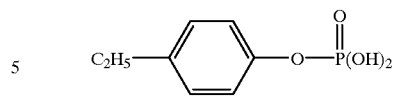

phenylphosphonic acid

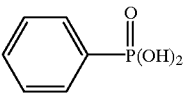

and salts of these compounds, and phosphinic acid such as:
phenylphosphinic acid

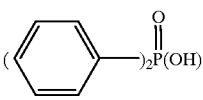

and salt of this compound.

In the examples as described above, organic phosphorus compound having aryl group is preferably used, or more preferably, organic phosphorus compound having phenyl group is used.

The organic phosphorus compounds as given above have property to be adsorbed or bonded to the surface of metal by the above polar groups, and it is estimated that the organic phosphorus compounds are present on the surface of ferromagnetic powder in the magnetic layer by adsorbing or bonding by the polar groups. In the adsorbing ability to the surface of metal, the organic phosphorus compounds used in the present invention have higher adsorbing ability than organic metal compounds such as carboxylic acid or sulfonic acid. Once adsorbed, the organic phosphorus compound is not easily removed from the metal surface. Therefore, the organic phosphorus compound is tightly adsorbed to the surface of the ferromagnetic powder in the present invention and is covered with aromatic ring or the like. As a result, the affinity to resin component in the ferromagnetic powder is increased, and it appears that dispersion stability of the ferromagnetic powder is also improved.

Because the ferromagnetic powder and the binder perform strong interaction due to the action of the organic phosphorus compound, removal of the component from the surface of the ferromagnetic powder does not occur when a magnetic layer is formed, and this extensively contributes to the improvement of running property and running durability. Further, the organic phosphorus compound used in the present invention has lower water absorption ability than other organic compounds such as sulfonic acid, and it has good water resistant property and high durability.

The magnetic layer of the present invention contains the organic phosphorus compound as described above by 0.03 to 10 weight parts to 100 weight parts of the ferromagnetic powder. In particular, when the content is set to the range of 0.04 to 7 weight parts, glossiness of the surface of the magnetic layer increases, and this indicates that the ferromagnetic powder is satisfactorily dispersed. Further, by setting the content to the range of 0.05 to 5 weight parts, electromagnetic transfer characteristics can be extensively improved. If the content is lower than 0.03 weight parts, the effect of blending is not adequately obtained. If it is blended by more than 10 weight parts, dispersion of the ferromagnetic powder may not be improved further.

To add the organic phosphorus compound to the magnetic layer and to improve dispersion property of the ferromagnetic powder, there are the following methods: The organic phosphorus compound is dissolved or dispersed in an organic solvent having low boiling point, and ferromagnetic powder is placed into the solution and is mixed well. Then, the ferromagnetic powder pre-treated with the organic phosphorus compound is adjusted by removing the organic solvent, and the magnetic recording medium is prepared using the pre-treated ferromagnetic powder. Or a method, in which, when coating solution of the magnetic layer is prepared, the organic phosphorus compound is directly kneaded and dispersed, or it is preferably dissolved or dispersed in a part of solvent for the coating solution for the magnetic layer, and kneading and dispersion are performed.

As the binder containing amino group or quaternary ammonium group, vinyl chloride resin or polyurethane resin are most preferably used. It is preferable to use polyester resin, cellulose resin, acrylic resin, and phenoxy resin, which have high solubility in organic solvent, high elasticity and breaking extension and high dynamic strength.

The polyurethane containing amino group or the vinyl chloride containing amino group have the following amino group or quaternary ammonium base:

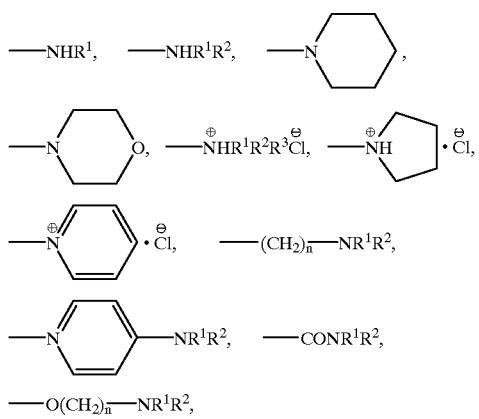

(where $R^1$, $R^2$ and $R^3$ each independently represents hydrogen atom, alkyl group having 2 to 5 carbon atoms, phenyl group, phenyl group substituted by an alkyl group having 1 to 5 carbon atoms, or a hydroxyalkyl group having 1 to 5 carbon atoms).

The amino group may be contained in a main chain as a unit to constitute the main chain or may be contained in a side chain.

In case the amino group is contained in the side chain, the amino group may be directly bonded to a carbon atom in the main chain as a side chain, or the amino group may be bonded, as a side chain, to a carbon atom in the main chain, via a group selected from alkyl group having 1 to 25 carbon atoms, aryl group having 6 to 20 carbon atoms, aralkyl group or alkylaryl group, oxygen atom, carbonyl group, carbonyloxy group, alkyl group having 1 to 25 carbon atoms and having oxygen atoms, carbonyl group and carbonyloxy group in the chain, or aryl group, aralkyl group or alkylaryl group having 6 to 20 carbon atoms.

When the polyurethane resin not containing amino group and the vinyl chloride resin and amino compound are used instead of the polyurethane resin containing amino group and the vinyl chloride resin containing amino group of the present invention, and these compounds are simply added and dispersed in a composition for forming the magnetic layer and the magnetic layer is formed without reacting them with each other, dispersion property decreases as time elapses although there is some improvement in dispersion property and surface smoothness of the ferromagnetic powder and the non-magnetic powder, and the object of the present invention cannot be attained.

The polyurethane resin containing amino group used in the present invention can be produced by a method already known in the art from the following compounds: polyester polyol containing the above amino group, polyol containing amino group such as polycarbonate polyol, polyester polyol not containing amino group, or polyol such as polycarbonate polyol and diisocyanate. For example, in the method described in "Polyurethane Resin" (published by Nikkan Kogyo Shimbun, Ltd.), it can be produced by replacing a part of dihydric alcohol or dibasic acid by diol containing amino group or by dibasic acid containing amino group.

The polyol containing amino group is a polyol as described below, which has an amino group expressed by the above general formula in the main chain or the side chain of the polyol.

The polyester polyol can be synthesized, for example, by condensation polymerization of dihydric alcohol with dibasic acid, or by ring-opening polymerization of lactones, e.g. caprolactone. As typical examples of dihydric alcohol, glycols such as ethylene glycol, propylene glycol, butanediol, 1.6-hexanediol, cyclohexanedimethanol, etc. may be used. As typical examples of dibasic acid, adipic acid, pimelic acid, azelaic acid, sebacic acid, phthalic acid, terephthalic acid, etc. may be used.

The polycarbonate polyol is a polycarbonate polyester polyol having molecular weight of 400 to 30,000 and hydroxyl value of 5 to 300, which is obtained by condensation of a polyhydric alcohol expressed by the following general formula:

HO—R—OH (where R represents —(CH$_2$)n— [n=3 to 14]

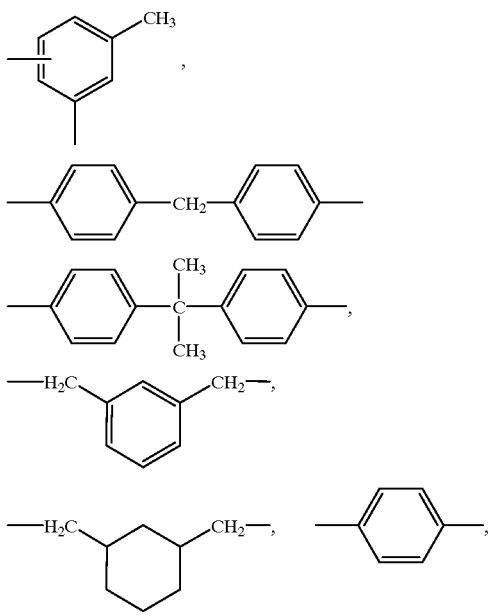

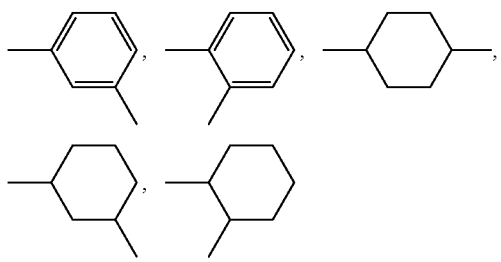
-continued and phosgene, chloroformic ester, dialkyl carbonate or diallyl carbonate, or which is obtained by condensation of polycarbonate polyol having molecular weight of 300 to 20,000 and hydroxyl value of 200 to 300 synthesized by ester interchange with a dihydric carboxylic acid having the following general formula:

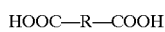
HOOC—R—COOH (where R represents alkylene group having 3 to 6 carbon atoms, 1,4- or 1,3- or 1,2-phenylene group or 1,4-, 1,3- or 1,2-cyclohexylene group.)

To the polyol, the other polyol, e.g. polyether polyol or polyester ether polyol or polyester may be blended by 90 weight % to the polyol and used.

As the polyisocyanate to be used to form the polyurethane by reaction with the polyol, there is no restriction, and the compound normally used may be adopted for this purpose. For example, hexamethylene diisocyanate, toluidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate, 4,4-diphenylmethane diisocyanate, 3,3-dimethylphenylene diisocyanate, etc. may be used.

As a chain extender, polyhydric alcohol, as described above, aliphatic polyamine, cycloaliphatic polyamine, aromatic polyamine, etc. may be used.

The preferable adding quantity of amino group or quaternary ammonium base is $1\times10^{-3}$ to $5\times10^{-6}$ eq/g, or more preferably $1\times10^{-4}$ to $1\times10^{-6}$ eq/g. If it is less than $1\times10^{-3}$ eq/g, the effect to add the polyurethane containing amino group cannot be obtained. If it is more than $5\times10^{-6}$ eq/g, viscosity of the coating material increases, and this extremely decreases workability and causes difficulty to handle.

Average molecular weight of the polyurethane resin containing amino group is preferably 5,000 to 100,000, or more preferably 10,000 to 50,000. If it is less than 5,000, the magnetic coating material thus obtained becomes fragile and physical strength is decreased. Durability of the magnetic tape is also adversely affected.

If it is more than 100,000, solubility in solvent decreases, resulting in poor dispersion property. Also, viscosity of the coating material at a given concentration is increased. This leads to lower workability and difficulty to handle.

It is preferable that branched OH groups are contained as OH groups to have good curing property and high durability. OH groups are preferably contained by 2 to 40 per molecule, or more preferably by 3 to 20 per molecule.

The vinyl chloride resin to be simultaneously used with the polyurethane containing amino group of the present invention can be obtained by reaction of the vinyl chloride resin with amine compound. By this method, at the same time with saponification reaction of vinyl chloride/vinylester resin, a part of amine compound reacts with chlorine atoms in the vinyl chloride component and it is introduced in the side chain. This quantity is calculated from nitrogen atom analysis value by Kjeldahl method, supposing that one molecule of the amine compound is added to one molecule of vinyl chloride.

As the amine compound to be used in saponification, there are primary, secondary, and tertiary amines such as aliphatic amine, cycloaliphatic amine, alkanolamine, alkoxyalkylamine, etc. More concretely, the following compounds may be used: methylamine, ethylamine, propylamine, butylamine, cyclohexylamine, ethanolamine, naphthyl-amine, aniline, o-toluidine, dimethylamine, diethylamine, dioctylamine, diisobutylamine, diethanolamine, methylethanolamine, dimethylethanolamine, dibutylethanolamine, methyldiethanolamine, 2-methoxyethylamine, di-2-methoxy-methylamine, N-methylaniline, trimethylamine, triethylamine, triisobutylamine, tridecylamine, N-methylbutylamine, N-methylphenylamine, hexamethylenetetramine, triethanolamine, dimethylpropylamine, pyridine, α-picoline, β-picoline, γ-picoline, 2,4-lutidine, quinoline, morpholine, diamino-propane, hexamethylenediamine, etc.

The methods to produce these compounds is already known in the art, and these are described, for example, in "Experimental Methods for High Molecular Synthesis" (by Takayuki Ohtsu; published by Kagaku Dojin Co., Ltd.; 1972). These methods can be used in the present invention.

Also, the vinyl chloride resin containing amino group can be obtained by copolymerization of vinyl monomer containing amino group with vinyl chloride monomer or other copolymerizable monomer.

As the vinyl monomer containing amino group, monomer such as acrylic acid ester, methacrylic acid ester or allylester, etc., which contains primary, secondary or tertiary aliphatic amino group expressed by the above general formulae, cycloaliphatic amino group, alkanolamino group or quaternary ammonium base may be used.

As the amine compound to be used in copolymerization, the same amine compound used in the production of the polyurethane resin containing amino group may be used.

As the other copolymerizable monomer, the following compounds may be used: vinyl acetate, vinyl propionate, (meth)acrylate acid ester, (meth)acrylic acid, maleic acid anhydride, acrylonitrile, vinylidene chloride, hydroxyethyl (meth)acrylate, glycidyl-(meth)acrylate, etc.

The vinyl chloride copolymer thus obtained may be saponified to turn vinyl acetate, vinyl propionate, etc. to vinyl alcohol components.

It is preferable that vinyl units containing amino group are incorporated by 0.05 to 5 weight % to the total content. If it is less than 0.05 weight %, there is no effect to improve dispersion property of the non-magnetic powder or the magnetic powder. On the other hand, if it is more than 5 weight %, viscosity of the coating material increases, and the pot life when isocyanate compound is added is shortened.

It is preferable that the vinyl chloride units are contained by 57 to 98 weight %. If it is less than 57 weight %, coating film strength of the resin is decreased. If it is more than 98 weight %, solubility of ketones, esters, etc. of the resin in organic solvent decreases.

It is preferable that vinyl alcohol units are contained by 2 to 16 weight %. If it is less than 2 weight %, no effect can be obtained to improve solubility of ketones, esters, etc. in organic solvent when the coating material is prepared, to improve dispersion property of non-magnetic powder or magnetic powder, to improve reactivity with isocyanate compound simultaneously used with the resin, and to improve compatibility with the other resin. If it is more than 16 weight %, viscosity of the coating material increases too much, and the pot life when isocyanate compound is added is shortened.

The other copolymerizable monomer may be contained by 0 to 26 weight %. If it is contained beyond this range, dynamic property and dispersion property of the entire resin are decreased.

Average polymerization degree is preferably 200 to 800, or more preferably 250 to 700. If it is less than 200, the obtained magnetic coating film becomes fragile and mechanical strength decreases, and this also adversely affects durability of the magnetic tape. If it is more than 800, viscosity of the coating material at a given concentration increases. This extremely decreases workability and leads to difficulty to handle.

Further, as the binder used in the present invention, in addition to the polyurethane resin containing amino group and the vinyl chloride resin containing amino group as described above, the other binder may be simultaneously used in the quantity lower than total content of the above compounds. There is no special restriction to the other resin for simultaneous use, and any type already known of thermoplastic resin, thermosetting resin, reactive resin or mixture of these resins used as the binder for the magnetic recording medium in the past may be used.

More concretely, thermoplastic resin may be used, which has glass transition temperature of −100 to 150° C., number average molecular weight of 1,000 to 200,000, or more preferably 10,000 to 100,000, and polymerization degree of about 50 to 1,000.

As such compounds, there are polymer, copolymer, polyurethane resin, various types of rubber type resins, which contain acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc. as constituents.

As the thermosetting resin or the reactive resin, there are phenol resin, phenoxy resin, epoxy resin, urea resin, melamine resin, alkyd resin, acrylic reactive resin, formaldehyde resin, silicone resin, epoxy-polyamide resin, mixture of polyester resin with isocyanate pre-polymer, etc.

The ferromagnetic powder used in the magnetic recording medium of the present invention is powder of ferromagnetic iron oxide, cobalt-containing ferromagnetic iron oxide or ferromagnetic alloy having $S_{BET}$ specific surface area of 40 to 80 m$^2$/g, or more preferably 50 to 70 m$^2$/g. Crystallite size is preferably 12 to 25 nm, or more preferably 13 to 22 nm, or most preferably 14 to 20 nm. Longer axis length is preferably 0.05 to 0.25 μm, or more preferably 0.07 to 0.2 μm, or most preferably 0.08 to 0.15 μm. As the ferromagnetic metal powder, Fe, Ni, Fe—Co, Fe—Ni, Co—Ni, Co—Ni—Fe, etc. may be used. Within the range of 20 weight % or less of the metal components, an alloy containing the following elements may be used: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth. The ferromagnetic metal powder may contain small quantity of water, hydroxide or oxide. A method to produce the ferromagnetic powder is already known, and the ferromagnetic powder used in the present invention may be produced by the method already known.

There is no special restriction on the shape of the ferromagnetic powder. Normally, the powder having needle-like, granular, cubic, rice grain-like or planar shape may be used. In particular, it is preferable to use ferromagnetic powder of needle-like shape.

The magnetic recording medium of the present invention may comprise a non-magnetic lower coating layer or a magnetic lower coating layer, which contains a binder having a resin used for the magnetic layer as described above and non-magnetic powder or magnetic powder and which is placed on a non-magnetic support member. As the non-magnetic powder, the powder may be selected from inorganic compound such as metal oxide, metal carbonate, metal sulfate, metal nitride, metal carbide, metal sulfide, etc. As the inorganic compound, the following substances may be used alone or in combination: α-alumina having alpha ratio of 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. Titanium dioxide, zinc oxide, iron oxide or barium sulfate is preferably used, or more preferably titanium dioxide is used. Average particle size of the non-magnetic powder is preferably 0.005 to 2 μm. When necessary, non-magnetic powder having different average particle sizes may be combined, or non-magnetic powder may be used alone with wider particle size distribution to obtain the same effect. Above all, average particle size of the non-magnetic powder is preferably 0.01 to 0.2 μm. It is preferable that pH value of the non-magnetic powder is between 6–9. Specific surface area of the non-magnetic powder is preferably 1 to 100 m$^2$/g, or more preferably 5 to 50 m$^2$/g, or most preferably 7 to 40 m$^2$/g. Crystallite size of the non-magnetic powder is preferably 0.01 to 2 μm. Oil absorption using DBP is preferably 5 to 100 ml/100 g, or more preferably 10 to 80 ml/100 g, or most preferably 20 to 60 ml/100 g. Specific gravity is preferably 1 to 12, or more preferably 3 to 6. The shape may be needle-like, spherical, polyhedron, or planar shape.

It is preferable that surface treatment is performed on the surface of the non-magnetic powder with $Al_2O_3$, $SiO_2$, $TiO_2$, $ZrO_2$, $SnO_2$, $Sb_2O_3$, or ZnO. $Al_2O_3$, $SiO_2$, $TiO_2$ or $ZrO_2$ is preferably used to have better dispersion property, or more preferably, $Al_2O_3$, $SiO_2$, or $ZrO_2$ is used. These may be used in combination or alone. Depending upon the purpose, coprecipitated surface treatment layer may be used, or a method to treat with alumina and then to treat with silica, or a method with reverse procedure may be adopted. The surface treatment layer may be made as porous layer, while it is generally preferable to have a homogeneous and dense layer.

As the magnetic powder, which can be used for the lower coating layer, it is preferable to use an alloy having γ-$Fe_2O_3$, Co-modified γ-$Fe_2O_3$, and α-Fe as major component, or $CrO_2$ may be used. In particular, it is preferable to use Co-modified γ-$Fe_2O_3$. The ferromagnetic powder to be used in the lower layer of the medium of the present invention has preferably the same composition and performance characteristics as those of the ferromagnetic powder used in the upper magnetic layer. However, performance characteristics may be varied between the upper and the lower layers depending upon the purpose. For example, to improve long wavelength recording characteristics, it is desirable to set Hc of the lower magnetic layer to a value lower than that of the upper magnetic layer. Also, it is effective to have Br of the lower magnetic layer to a value higher than that of the upper magnetic layer. In addition, it is possible to give advantage by adopting the multiple layer arrangement as already known.

As the other additives to be used for the magnetic layer or the lower coating layer of the present invention, a compound having lubricating effect, antistatic effect, dispersion effect, plasticizing effect, etc. may be used. The following compounds may be used: molybdenum disulfide, tungsten disulfide, graphite, boron nitride, graphite fluoride, silicone oil, silicone having polar group, fatty acid modified silicone, fluorine-containing silicone, fluorine-containing alcohol, fluorine-containing ester, polyolefin, polyglycol, alkylphosphoric acid ester and its alkali metal salt, alkyl sulfuric acid and its alkali metal salt, polyphenyl ether, fluorine-containing alkyl sulfuric acid ester and its alkali metal salt, monobasic fatty acid, which has 10 to 24 carbon atoms and may contain unsaturated bond or may be branched, and its metal salt (such as Li, Na, K, Cu), or monohydric, dihydric, trihydric, tetrahydric, pentahydric or hexahydric alcohol, which has 12 to 22 carbon atoms and may contain unsaturated bond or may be branched, alkoxy alcohol, which has 12 to 22 carbon atoms and may contain unsaturated bond or may be branched, mono-fatty acid ester or di-fatty acid ester or tri-fatty acid ester, comprising a monobasic fatty acid, which has 10 to 24 carbon atoms and may contain unsaturated bond or may be branched, and one of monohydric, dihydric, trihydric, tetrahydric, pentahydric, or hexahydric alcohol, which has 2 to 12 carbon atoms and may contain unsaturated bond or may be branched, fatty acid ester of monoalkyl ether of alkylene oxide polymerization product, fatty acid amide having 2 to 22 carbon atoms, aliphatic amine having 8 to 22 carbon atoms, etc. As typical examples of these compounds, the following substances may be used: lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, lauryl alcohol, etc.

Also, the following compounds may be used: nonionic surface active agent such as alkylene oxide type, glycerine type, glycidol type, alkylphenolethylene oxide addition product, etc., cationic surface active agent such as cyclic amine, esteramide, quaternary ammonium salt, hydantoin derivative, heterocyclic compound, phosphonium or sulfonium, etc., anionic surface active agent containing acid group such as carboxylic acid, sulfonic acid, phosphoric acid, sulfuric acid ester group, phosphoric acid ester group, etc., amphoteric surface active agent such as sulfuric acid or phosphoric acid esters of amino acids, aminosulfonic acids, amino alcohol, alkylbedain type, etc. The details of these surface active agents are described in "Handbook of Surface Active Agents" (published by Sangyo Tosho Co., Ltd.). These lubricants, antistatic agents, etc. may not necessarily be pure, and may contain impurities such as isomer, unreacted product, side reaction product, decomposed product, oxide, etc. in addition to the main component. The content of the impurities is preferably not more than 30 weight %, or more preferably, not more than 10 weight %.

Types and quantities of these lubricants and surface active agents used in the present invention may be selected as necessary for the non-magnetic layer and the magnetic layer. For example, these compounds may be used to have the following effects: an effect to control bleeding to the surface using esters having different boiling points or polarities, an effect to improve stability of coating by adjusting the quantity of the surface active agent, or improvement of lubricating effect by increasing the quantity of the lubricant to be added to the non-magnetic layer, and the application is not limited to the above effects. Or, all or a part of the additives used in the present invention may be added in any of the processes during manufacture of the coating solution for the magnetic layer or for the lower layer. For example, these may be added to mix with ferromagnetic powder prior to the kneading process, or may be added in the kneading process of the ferromagnetic powder, binder and solvent, or may be added in the dispersion process, or may be added after dispersion process or immediately before the coating.

As the lubricants to be used in the present invention, the following products may be used: NAA-102, castor oil curing fatty acid, NAA-42, Cation SA, Nymeen L-201, Nonion E-208, Anon BF, Anon LG, butyl stearate, butyl laurate, and erucic acid (manufactured by Nippon Oil & Fats Co., Ltd.), oleic acid (manufactured by Kanto Chemical Co., Ltd.), FAL-205 and FAL-123 (manufactured by Takemoto Oil & Fats Co., Ltd.), Enujerb OL (manufactured by Shinnippon Rika Co. Ltd.), TA-3 (manufactured by Shin-Etsu Chemical Co., Ltd.), Armide P (manufactured by Lion Armor Co., Ltd.), Duomine TDO (manufactured by Lion Corporation), BA-41G (manufactured by Nisshin Oil Mills, Ltd.), Profan 2012E, Newpole PE61, and Ionett MS-400 (manufactured by Sanyo Chemical Industries Ltd.)

The coating solution prepared from the above materials is coated on a non-magnetic support member, and a lower coating layer or a magnetic layer is formed.

As the non-magnetic support member to be used in the present invention, the following compounds processed by biaxial stretching may be used: polyethylene naphthalate, polyethylene terephthalate, polyamide, polyimide, polyamideimide, aromatic polyamide, polybenzoxidazole. More preferably, polyethylene naphthalate or aromatic polyamide may be used. The non-magnetic support member may be processed in advance by corona discharge, plasma processing, adhesion processing, heat treatment, etc. It is preferable that the non-magnetic support member to be used in the present invention has such good smoothness that average surface roughness on centerline is 0.1 to 20 nm with cut-off value of 0.25 mm, or more preferably 1 to 10 nm. It is preferable in the non-magnetic support member that not only average surface roughness on centerline is small but there is no coarse protrusion of more than 1 $\mu$m.

To manufacture the magnetic recording medium of the present invention, a coating solution for the magnetic layer is coated, for example, on the surface of the non-magnetic support member under running condition. Here, two or more types of magnetic layer coating solutions may be coated one after another or at the same time, or the lower layer coating solution and the magnetic layer coating solution may be coated one after another or at the same time.

As the coating means to coat the above magnetic coating solution or the lower layer coating solution, air doctor coat, blade coat, rod coat, extrusion coat, air knife coat, squeeze coat, impregnation coat, reverse roll coat, transfer roll coat, gravure coat, kiss coat, cast coat, spray coat, spin coat, etc. may be used.

For the coating technique, reference may be made, for example, to: "The Latest Coating Technique" published by Sogo Gijutsu Center, Ltd. (May 31, 1983).

In case the present invention is applied to a magnetic recording medium having two or more layers, the following may be proposed as the devices and methods for the coating:

(1) By a coating device such as gravure, roll, blade, extrusion, etc. generally applied in the coating of a magnetic coating material, the lower layer is coated at first. While the lower layer is not yet completely dried, the upper layer is coated by a support member pressurizing type extrusion coating device as disclosed in JP-B-1-46186, JP-A-60-238179, JP-A-2-265672, etc.

(2) The upper and the lower layers are coated almost at the same time using a coating head having two slits to pass the coating solution, as disclosed in JP-A-63-88080, JP-A-2-17971, or JP-A-2-265672.

(3) The upper and the lower layers are coated at the same time by an extrusion coating device having a back-up roll as disclosed in JP-A-2-174965.

On the surface of the non-magnetic support member of the present invention where magnetic coating material is not coated, a back-coat (backing layer) may be provided. The back-coat layer is a layer, which is produced by coating a back-coat layer forming coating material (produced by dispersing granular component such as abrasive material, antistatic agent, etc. and a binder in an organic solvent) on a surface of the non-magnetic support member where the magnetic coating material is not coated. As the granular component, various types of inorganic pigment or carbon black may be used. As the binder, nitrocellulose, resin such as phenoxy resin, vinyl chloride resin, polyurethane, etc. may be used alone or by mixing.

As the polyurethane resin to be used for the back-coat layer, the polyurethane resin of the present invention may be used to further improve the durability.

An adhesive layer may be provided on the surface of the non-magnetic support member where the magnetic layer coating solution and the back-coat forming coating material are coated.

The coating layer coated with the magnetic layer coating solution is dried after magnetic field orientation processing has been performed on the ferromagnetic powder contained in the coating layer of the magnetic layer coating solution.

After being dried, the coating layer is processed by surface smoothening process. For the surface smoothening process, a super-calender roll is used, for example. By the surface smoothening process, empty bores generated by removal of the solvent when drying are eliminated, and filling ratio of the ferromagnetic powder in the magnetic layer is increased. This provides a magnetic recording medium having higher electromagnetic transfer characteristics.

As the calender processing roll, a heat-resistant plastic roll such as epoxy, polyimide, polyamide, polyamideimide, etc. may be used. Also, a metal roll may be used.

The magnetic recording medium of the present invention has preferably the surface with such good smoothness that average surface roughness on centerline is 0.1 to 4 nm, or more preferably 1 to 3 nm with cut-off value of 0.25 mm. For this purpose, the magnetic layer formed by selecting a specific type of ferromagnetic powder and a binder as described above is processed by calender processing. In the calender processing conditions, the temperature of calender roll is preferably set within the range of 60 to 100° C., or more preferably 70 to 100° C., or most preferably 80 to 100° C. The pressure is preferably within the range of 100 to 500 kg/cm, or more preferably 200 to 450 kg/cm, or most preferably 300 to 400 kg/cm.

The magnetic recording medium thus obtained can be used by cutting to a desired size using a cutter.

When the organic phosphorus compound of the present invention is kneaded and dispersed in a solvent with the magnetic powder or non-magnetic powder, it is strongly adsorbed on the surface of the powder. In this case, the adsorbed site on the surface of the powder is considered to be the site having basic (alkali) property. The organic phosphorus compound thus adsorbed has alkyl group, alkenyl group or aryl group, and these organic groups are directed toward outside of the surface of the magnetic layer. When the binder is added in the next process and kneading and dispersion are performed, the surface of the ferromagnetic powder or non-magnetic powder is hydrophilic, while affinity of the organic groups with skeleton of the binder is high, and dispersion is likely to occur. Further, in the conventional technique, the groups such as $SO_3M$ group, COOH group, phosphoric acid group, etc. are introduced in the binder so that these are adsorbed on the surface of the magnetic powder or the non-magnetic powder. In this case, the site where polar group of the binder on the surface of the powder is adsorbed has basic property just as the adsorbed site of the organic compound, and competitive adsorption occurs. Therefore, to make the binder tightly adsorbed on the powder surface, it is necessary to perform fine adjustment of the adding quantity of the organic phosphorus compound. Even small change in the property of the powder surface may give extensive influence on the adsorption behavior and may decrease the dispersion property. Because the organic phosphorus compound is more easily adsorbed than the polar group of the binder, it is difficult to increase adsorption quantity of the binder.

It has been already known in the past that the increase of adsorption quantity of the binder leads to improvement of dispersion property and of dispersion stability, and further to the increase of dynamic strength of the coating film. After fervent study, the present inventors have found that non-adsorbed binder, above all, relatively low molecular component of the binder, is floated up on the surface of the coating film during coating and drying, and it was demonstrated that this was the main cause of head contamination during repeated running and that trouble due to adhesion occurs when the tape is stored at high temperature high humidity conditions.

The big difference from the conventional technique is that the polar group of the binder of the present invention is an amino group. The binder containing amino group has been known in the past, but optimal polar group has been simply selected depending upon whether it is acidic or basic when the surface property of the powder to be adsorbed is the same as that of $SO_3M$ group, COOH group, phosphoric acid group, etc., i.e. when the entire powder surface is observed as a whole.

The present inventors have taken special notice of the fact that there are both acidic points and basic points on the same powder surface. Thus, the organic phosphorus compound is adsorbed on the basic point, and after most of the powder surface has been covered with organic groups of the organic phosphorus compound and affinity with the main chain of the binder has been increased, the amino group of the binder is adsorbed on the acidic point of the powder. Unlike the conventional technique, in this method, no competitive adsorption occurs between the organic phosphorus compound, i.e. surface modifier of the powder, and the binder, and both substances can be adsorbed to each respective site, and adsorption quantity of the binder can be increased. It was also found that relatively low molecular components of the binder are tightly adsorbed. As a result, apart from the improvement of dispersion property, floating or migration of the low molecular components of the binder to the surface of the coating film can be extensively decreased, and this contributes to the improvement of durability, which may be adversely affected by wearing of the surface of the magnetic layer due to head contamination. Also, the trouble due to adhesion after the medium has been stored at high temperature high humidity conditions can be eliminated from the same reason.

EXAMPLES

In the following, the term "part(s)" means "weight part(s)", and the symbol "%" means "weight %".

Examples 1 to 4 and Comparative Examples 1 to 5

Using an open kneader, 100 parts of ferromagnetic alloy powder (composition: Fe 92%, Zn 4%, Ni 4%; Hc 2000 e; crystallite size 15 nm; BET specific surface area 59 m$^2$/g; longer axis diameter 0.12 μm; acicular ratio 7; δσ s 140 emu/g) were pulverized for 10 minutes. Next, 10 parts of methylethylketone, 3 parts of cyclohexanone, and 3 parts of toluene were added, and this was further mixed and kneaded for 30 minutes. Next, the binder shown in Table 1, 15 parts of methylethylketone, and 10 parts of methylisobutylketone were added, and this was kneaded for 60 minutes. Then, the following compounds were added:

| | |
|---|---|
| Abrasive (Al$_2$O$_3$) (particle size 0.3 μm) | 2 parts |
| Carbon black (particle size 40 nm) | 2 parts |
| Methylethylketone | 250 parts | and this was dispersed for 120 minutes using a sand mill. Then, the following compounds were added:

| | |
|---|---|
| Polyisocyanate Coronate 3041; Nippon Polyurethane Co., Ltd.) | (solid component) 5 parts |
| Isoamyl stearate | 2 parts |
| Stearic acid | 1 part |
| Methylethylketone | 50 parts |

After stirring and mixing for 20 minutes, this was filtered through a filter having average pore size of 1 μm, and a magnetic layer coating solution was prepared. The magnetic layer coating solution thus prepared was coated on the surface of an aramide support member of 6 μm in thickness to have the thickness of 2.0 μm when dried, using a reverse roll. On the non-magnetic support member where the magnetic layer coating solution has been coated, magnetic field orientation was performed using a magnet of 3000 gauss while the coating solution was not yet dried. After drying, calender processing was performed by a combination of metal roll—metal roll—metal roll—metal roll—metal roll—metal roll—metal roll (speed 100 m/min.; linear pressure 300 kg/cm; temperature 90° C.), and the product thus obtained was cut to have a width of 6.35 mm, and a tape for digital video tape recorder was prepared. The properties of the tape thus obtained were determined by the following measuring methods. The results are shown in Table 1.

Examples 5 and 6 and Comparative Example 6
(Preparation of magnetic solution for the upper layer)

A magnetic layer coating solution was prepared by the same procedure as in Example 1.
(Preparation of non-magnetic layer coating solution for the lower layer)

Next, 85 parts of titanium oxide (average particle size 0.035 μm; crystal type rutile; TiO$_2$ content 90% or more; Surface treatment layer: alumina; $S_{BET}$ 35–42 m$^2$/g; true specific gravity 4.1; pH 6.5–8.0) were pulverized for 10 minutes using an open kneader. Then, 10 parts of methylethylketone, 3 parts of cyclohexanone, and 3 parts of toluene were added, and this was mixed and kneaded for 30 minutes. Next, the binder shown in Table 2, 15 parts of methylethylketone, and 10 parts of methylisobutylketone were added, and kneading was performed for 60 minutes. Then, the following compounds were added:

| | |
|---|---|
| Carbon black (particle size 0.1 μm) | 2 parts |
| Methylethylketone | 200 parts | and this was dispersed for 120 minutes using a sand mill. To this, the following compounds were added:

| | |
|---|---|
| Butyl stearate | 2 parts |
| Stearic acid | 1 part |
| Methylethylketone | 50 parts |

After stirring and mixing for 20 minutes, this was filtered through a filter having average pore size of 1 μm, and a non-magnetic layer coating solution was prepared.

The non-magnetic layer coating solution thus prepared was coated on the surface of an aramide support member of 6 μm in thickness to have the thickness of 2.0 μm, and immediately thereafter, the magnetic layer coating solution was coated to have the thickness of 0.1 μm when dried, using a reverse roll.

On the non-magnetic support member where the magnetic layer coating solution has been coated, magnetic field orientation was performed using a magnet of 3000 gauss while the coating solution was not yet dried. After drying, calender processing was performed by a combination of metal roll—metal roll—metal roll—metal roll—metal roll—metal roll—metal roll (speed 100 m/min.; linear pressure 300 kg/cm; temperature 90° C.), and the product thus obtained was cut to have a width of 6.35 mm, and a tape for digital video tape recorder was prepared. The properties of the tape thus obtained were determined by the following measuring methods. The results are shown in Table 2.

The properties of the magnetic recording media of Examples and Comparative Examples thus prepared were determined by the following measuring methods. The results are shown in Table 2.

[Measuring methods]
(1) Non-adsorbed low molecular binder components

The dispersion solution before curing agent was added was separated by centrifuge, and the supernatant was quantitatively determined. Further, by GPC measurement, the percentage of the components having molecular weight of less than 10,000 was obtained from peak area ratio, and the quantity of the low molecular non-adsorbed components in the dispersion solution was calculated.
(2) Wearing quantity of the binder on the surface of the magnetic layer The surface of the magnetic layer of 5,000 m in length was scraped using a razor blade. Of a part of the binder attached on the razor blade, the components dissolved in tetrahydrofurane were determined by GPC, and the component having molecular weight of less than 10,000 were relatively compared by peak area ratio using a chart for RI detection. The result was expressed in a relative value with the value of Comparative Example 1 as 100.

(3) Electromagnetic transfer characteristics

On the specimen tape, recording was performed by recording wavelength of 0.5 μm, and head speed of 10 m/sec. using a drum tester, and the recorded data was reproduced. Relative C/N of the tape was evaluated when C/N of the tape of Comparative Example 1 was considered as 0 dB.

(4) Surface roughness Ra (6) Head contamination

A 60-minute-length tape was repeatedly and continuously run by 100 times under the condition of 40° C. and 10% relative humidity using a digital video tape recorder (NV-BJ1; Matsushita Electric). Contamination of the video head was examined. When video head contamination was not found by visual inspection, it was defined as "good", and if contamination was observed, it was defined as "no good".

TABLE 1

| | Compound | Adding q'ty | Vinyl chloride resin | Adding q'ty (weight parts) | Polyurethane resin | Adding q'ty (weight parts) | Non-adsorbed low molecular components | Scraped q'ty | C/N (dB) | Roughness (Ra) (nm) | Storage adhesion | Head contamination |
|---|---|---|---|---|---|---|---|---|---|---|---|---|
| Example 1 | Phenyl phosphoric acid | 2.5 | A | 10 | PU-a | 8 | 29 | 21 | 0.9 | 2.5 | Not adhered | Good |
| Example 2 | Phenyl phosphoric acid | 2.5 | B | 10 | PU-a | 8 | 31 | 8 | 1 | 2.6 | Not adhered | Good |
| Example 3 | Phenyl phosphoric acid | 2.5 | A | 10 | PU-a | 8 | 15 | 16 | 1.1 | 2.5 | Not adhered | Good |
| Example 4 | Diphenyl phosphoric acid | 2.5 | A | 10 | PU-a | 8 | 25 | 12 | 1.3 | 2.4 | Not adhered | Good |
| Comparative example 1 | Phenyl phosphoric acid | 2.5 | C | 10 | PU-b | 8 | 100 | 100 | 0 | 3.3 | Adhered | No good |
| Comparative example 2 | Phenyl phosphoric acid | 2.5 | D | 10 | PU-c | 8 | 119 | 295 | −2.1 | 4.5 | Adhered | No good |
| Comparative example 3 | Phenyl phosphoric acid | 2.5 | E | 10 | PU-d | 8 | 390 | 560 | −3.9 | 6.9 | Adhered | No good |
| Comparative example 4 | None | 0 | A | 10 | PU-a | 8 | 78 | 85 | −0.5 | 3.7 | Not adhered | Good |
| Comparative example 5 | Lecithin | 2.5 | A | 10 | PU-a | 8 | 130 | 380 | −2.5 | 4.9 | Adhered | No good |

TABLE 2

| | Compound | Adding q'ty | Vinyl chloride resin | Adding q'ty | Polyurethane resin | Adding q'ty | Non-adsorbed low molecular components | Scraped q'ty | C/N (dB) | Roughness (Ra) (nm) | Storage adhesion | Head contamination |
|---|---|---|---|---|---|---|---|---|---|---|---|---|
| Example 5 | Phenyl phosphoric acid | 2.5 | A | 10 | PU-a | 8 | 21 | 18 | 2.5 | 1.9 | Not adhered | Good |
| Example 6 | Phenyl phosphoric acid | 2.5 | B | 10 | PU-a | 8 | 25 | 15 | 2.8 | 1.8 | Not adhered | Good |
| Comparative example 6 | None | 0 | A | 10 | PU-a | 8 | 86 | 95 | 1 | 3.3 | Not adhered | Good |

Average surface roughness on centerline was determined as Ra by light interference method using digital optical profimeter (manufactured by WYKO) with cut-off of 0.25 mm.

(5) Storage adhesion

The tape was stored for 4 weeks in an atmosphere maintained at 60° C. and 90% relative humidity with the tape accommodated in a cassette. Then, the tape was unwound. When it was adhered, it was defined as "adhered". When it was not, it was defined as "not adhered".

In the above tables, symbols and abbreviations are as follows:

(Vinyl chloride resin)

A: Vinyl chloride/vinyl acetate/hydroxybutyl acrylate/vinyl containing amino group (mol ratio: 88/5/5/2)

Polymerization degree=250

B: Vinyl chloride/Allylglycidylether/hydroxypropyl methacrylate/vinyl containing
quaternary amino group (85/10/3/2)
Polymerization degree=300
C: MR 110 (manufactured by Nippon Zeon Co., Ltd.)
Containing SO$_3$M group and epoxy group
Polymerization degree=300
D: Vinyl chloride/vinyl acetate/maleic acid/vinyl alcohol (90/5/1/4)
Polymerization degree=300
E: Vinyl chloride/vinyl acetate/vinyl alcohol (94/4/2)
Polymerization degree=300
(Polyurethane resin)
PU-a: Polycaprolactone type polyester polyol
Polar group/its content —N(CH$_3$)$_2$/100 eq/g
Tg 15° C.
Molecular weight (Mw) 56,000
PU-b: Polyester Polyurethane
Polar group/its content —SO$_3$Na/80 $\mu$ eq/g
Tg 70° C.
Molecular weight (Mw) 48,000
PU-c: Polycaprolactone type polyester polyurethane
Polar group/its content —COOH/100 $\mu$eq/g
Tg 20° C.
Molecular weight (Mw) 53,000
PU-d: Polyester polyurethane
Polar group None
Tg 15° C.
Molecular weight (Mw) 6,000

By a combination of a specific type of organic phosphorus compound and a binder containing amino group, smoothness of coating film is improved and electromagnetic transfer characteristics are also improved. Non-adsorbed binder components in the coating solution decrease, and wearing of the surface of the magnetic layer is eliminated. Head contamination is reduced and storage adhesion is extensively improved.

What we claim are:

1. A magnetic recording medium, comprising a magnetic layer where a ferromagnetic powder and a blinder are dispersed, said magnetic layer being placed on a non-magnetic support member, whereby said magnetic layer comprises at least one or more of organic phosphorus compounds selected from the group consisting of those of the following formulae (1) to (3) and a binder:

$$(R\text{---}O)_nP(OM)_{3-n} \tag{1}$$

$$(R\text{---}O)_nP(OM)_{3-n} \tag{2}$$

$$(R)_nP(OM)_{3-n} \tag{3}$$

where R represents a substituted or non-substituted alkyl group, alkenyl group or aryl group, M represents a hydrogen atom, an alkali metal atom or an ammonium group, and n is 1 or 2;

said binder containing an amino group or a quaternary ammonium base selected from the group consisting of $$\text{---NHR}^1, \quad \text{---NR}^1R^2 \text{ and } \text{---}\overset{\oplus}{\text{NR}}^1R^2R^3\text{Cl}^{\ominus},$$

where R$^1$, R$^2$ and R$^3$ each independently represents an alkyl group having 2 to 5 carbon atoms, a phenyl group, a phenyl group substituted by an alkyl group having 1 to 5 carbon atoms, or a hydroxyalkyl group having 1 to 5 carbon atoms.

2. A magnetic recording medium, comprising a lower layer where a non-magnetic powder or a ferromagnetic powder and a binder are dispersed, said lower layer being placed on a non-magnetic support member, and at least one or more magnetic layers where a ferromagnetic powder and a binder are dispersed are provided on said lower layer, wherein at least one or more of said magnetic layers or said lower layer comprise an organic phosphorous compound selected from the group consisting of those of the following formulae (1) to (3) and a binder:

$$(R\text{---}O)_nP(OM)_{3-n} \tag{1}$$

$$(R\text{---}O)_nP(OM)_{3-n} \tag{2}$$

$$(R)_nP(OM)_{3-n} \tag{3}$$

where R represents a substituted or non-substituted alkyl group, alkenyl group or aryl group, M represents a hydrogen atom, an alkali metal atom or an ammonium group, and n is 1 or 2;

said binder containing an amino group or a quaternary ammonium base selected from the group consisting of $$\text{---NHR}^1, \quad \text{---NR}^1R^2 \text{ and } \text{---}\overset{\oplus}{\text{NR}}^1R^2R^3\text{Cl}^{\ominus},$$

where R$^1$, R$^2$ and R$^3$ each independently represents a hydrogen atom, an alkyl group having 2 to 5 carbon atoms, a phenyl group, a phenyl group substituted by an alkyl group having 1 to 5 carbon atoms, or a hydroxyalkyl group having 1 to 5 carbon atoms.

3. The magnetic recording medium as claimed in claim 1, wherein the substituent of said substituted alkyl group, alkenyl group or aryl group represented by R is selected from the group consisting of a hydrocarbon group, a 2-aminoethyl group, a 2-butoxyethyl group and a p-phenyl group.

4. The magnetic recording medium as claimed in claim 2 wherein, the substituent of said substituted alkyl group, alkenyl group or aryl group represented by R is selected from the group consisting of a hydrocarbon group, a 2-aminoethyl group, a 2-butoxyethyl group and a p-phenyl group.

* * * * *